US006529373B1

(12) United States Patent
Liao et al.

(10) Patent No.: US 6,529,373 B1
(45) Date of Patent: Mar. 4, 2003

(54) COMPUTER ENCLOSURE INCORPORATING PIVOTABLE DRIVE BRACKET

(75) Inventors: Nien Chiang Liao, Tu-Chen (TW); Chiu-Chen Lin, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/558,944

(22) Filed: Apr. 26, 2000

(30) Foreign Application Priority Data

Feb. 22, 2000 (TW) ........................................ 89202836 U

(51) Int. Cl.⁷ ................................................. G06F 1/16
(52) U.S. Cl. .................... 361/685; 361/686; 312/223.2; 211/26
(58) Field of Search ........................ 361/679, 683–686; 312/223.1, 223.2, 322.1; 211/26

(56) References Cited

U.S. PATENT DOCUMENTS

| 5,808,864 A | * | 9/1998 | Jung ............................ 361/685 |
| 5,995,364 A | * | 11/1999 | McAnally et al. .......... 361/685 |
| 6,273,273 B1 | * | 8/2001 | Liao ............................ 211/265 |
| 6,318,838 B1 | * | 11/2001 | Liao ......................... 312/223.2 |

* cited by examiner

Primary Examiner—Darren Schuberg
Assistant Examiner—Yean-Hsi Chang
(74) Attorney, Agent, or Firm—Wei Te Chung

(57) ABSTRACT

A computer enclosure includes a cage and a drive bracket received in the cage for being rotatable between a fixed position and an assembling position. The cage has a pair of tabs each defining a cutout therein and an aperture defined between the tabs. The drive bracket has a pair of first protrusions pivotably received in the cutouts of the tabs thereby allowing the drive bracket to be rotatable with respect to the cage and a fixing plate defining a screw hole substantially aligning with the aperture of the cage for receiving a bolt to secure the drive bracket to the cage.

14 Claims, 6 Drawing Sheets

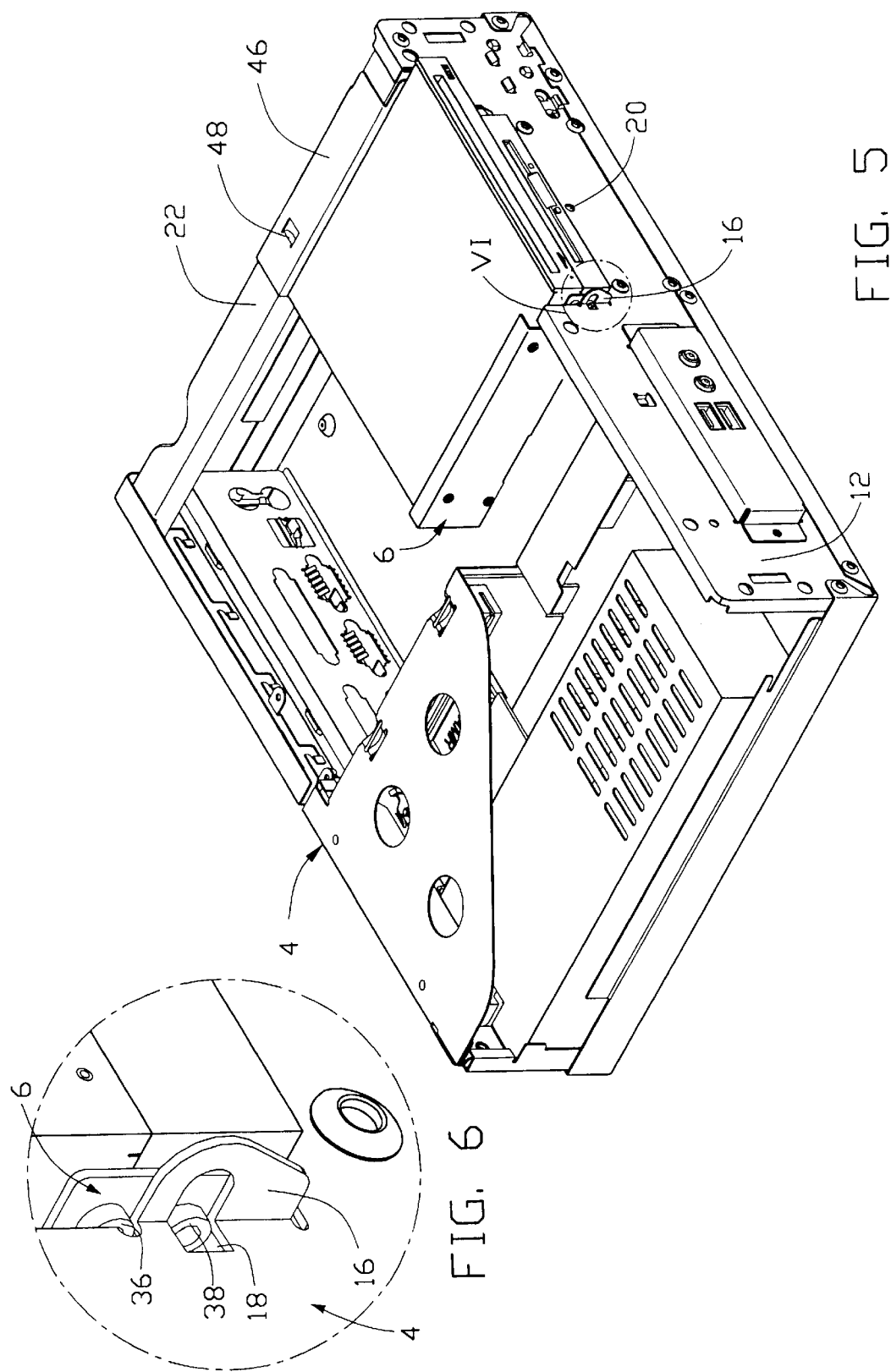

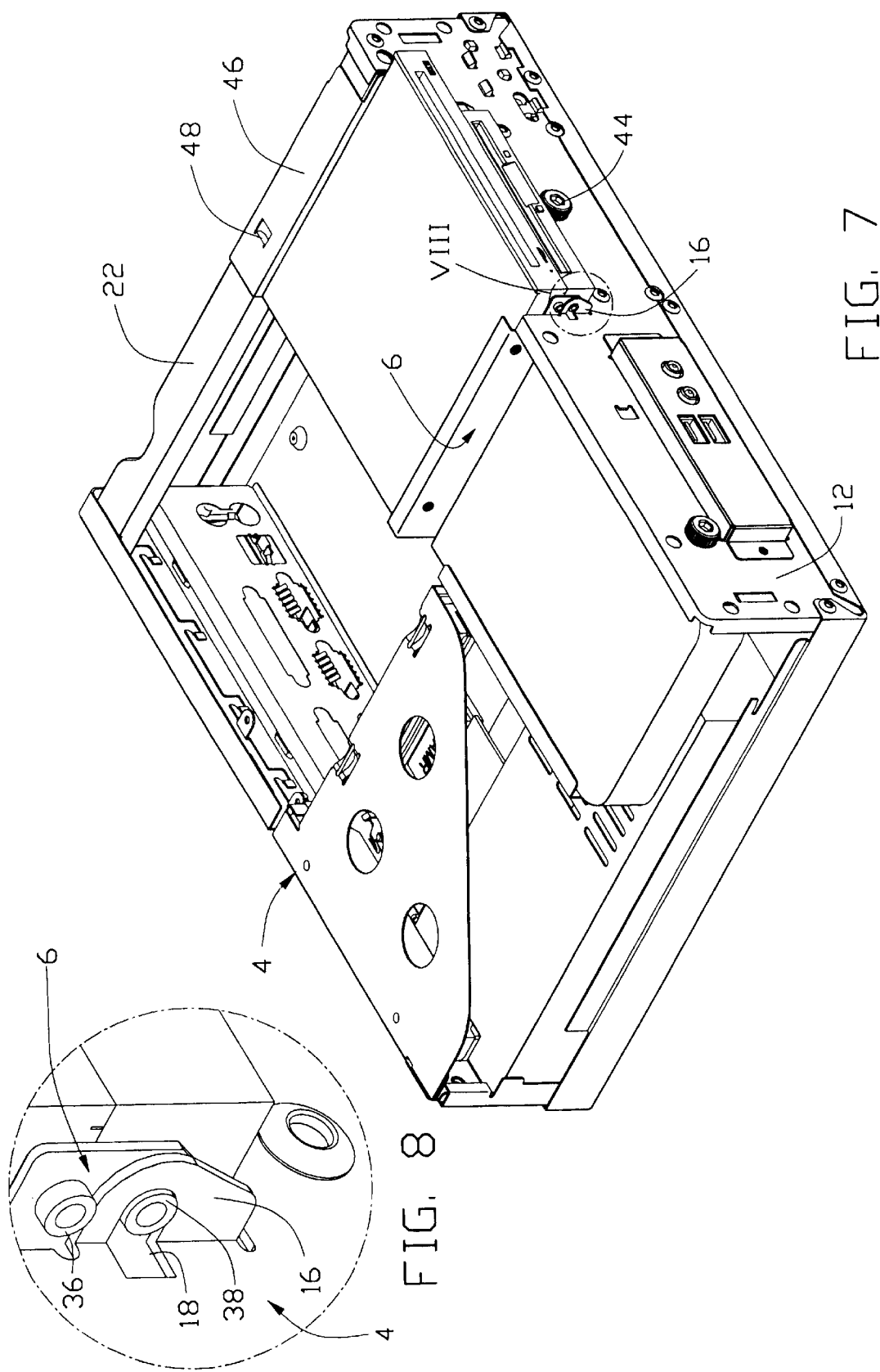

ated to the computer enclosure. The trend toward miniaturization in the computer industry requires fully exploiting the internal space of a computer. Since components in a computer are compactly arranged in a limited space defined inside a computer enclosure, the procedure for mounting the components, including data storage devices, inside the computer enclosure is complicated and inefficient.

COMPUTER ENCLOSURE INCORPORATING PIVOTABLE DRIVE BRACKET

BACKGROUND

1. Field of the Invention

The present invention relates to a computer enclosure, and particularly to a computer enclosure incorporating a pivotable drive bracket which is readily attached to the computer enclosure.

2. The Related Art

The trend toward miniaturization in the computer industry requires fully exploiting the internal space of a computer. Since components in a computer are compactly arranged in a limited space defined inside a computer enclosure, the procedure for mounting the components, including data storage devices, inside the computer enclosure is complicated and inefficient.

The data storage devices of a computer, such as a hard disk drive, a floppy disk drive and a CD-ROM drive, are mounted in drive brackets formed in an upper portion of the computer enclosure with a space defined thereunder for accommodating other components. It is difficult to mount other components under the drive brackets because the drive brackets cannot be readily removed after they are assembled. In other words, the existence of the drive brackets makes it difficult to mount other components thereunder. Taiwan Patent Application Nos. 81210924 and 83202773 disclose drive brackets for being securely attached to computer enclosures but these are hard to detach from the computer enclosures. Thus, it is inconvenient to mount a data storage device in the drive bracket and to assemble other components under the drive bracket.

To counter the above problem, a drive bracket attached to the computer enclosure is made pivotable about the computer enclosure from a locked position to an assembling position, such as that disclosed in Taiwan Patent Application No. 85209373. When the drive bracket is moved to the assembling position, a data storage device may be easily mounted to the drive bracket and other components may be easily assembled under the drive bracket. However, in the Taiwan Patent Application, the drive bracket is fixed to the computer enclosure by four bolts, which complicates assembly of the drive bracket the he computer enclosure. Thus, a drive bracket is required which can be readily attached to the computer enclosure.

SUMMARY OF THE INVENTION

Accordingly, an object of the present invention is to provide a computer enclosure incorporating a rotatable drive bracket which is readily attached to the computer enclosure.

Another object of the present invention is to provide a computer enclosure incorporating a drive bracket rotatable with respect to the computer enclosure for facilitating assembly of components in or under the drive bracket.

To achieve the above mentioned objects, a computer enclosure of the present invention comprises a cage and a drive bracket received in the cage for being rotatable between a fixed position and an assembling position. The cage has a pair of tabs each defining a cutout therein and an aperture defined between the tabs. The drive bracket has a pair of first protrusions pivotably received in the cutouts of the tabs thereby allowing the drive bracket to be rotatable with respect to the cage and a fixing plate defining a screw hole substantially aligning with the aperture of the cage for receiving a bolt to secure the drive bracket to the cage. The rotation of the drive bracket with respect to the cage allows an interior space of the cage to be exposed for facilitating mounting components in the cage under the bracket.

BRIEF DESCRIPTION OF THE DRAWINGS

Other objects, advantages and novel features of the present invention will be drawn from the following detailed embodiment of the present invention with attached drawings, in which:

FIG. 5 is an assembled view of FIG. 1 with the floppy disk drive and the CD-ROM drive of FIG. 4 attached to the drive bracket, the drive bracket being situated at a first position with respect to the computer enclosure;

FIG. 6 is an enlarged view of circled portion VI of FIG. 5;

FIG. 7 is similar to FIG. 5 but showing the drive bracket situated at a second position with respect to the computer enclosure;

FIG. 8 is an enlarged view of circled portion VIII of FIG. 7;

DESCRIPTION OF THE PREFERRED EMBODIMENT

A computer may comprise a plurality of data storage devices such as a CD-ROM drive, a floppy disk drive (FDD) and a hard disk drive (HDD), fixed in an enclosure for reading and storing data. A drive bracket in accordance with the present invention is provided for readily mounting data storage devices in the enclosure. For simplification and illustration, a CD-ROM drive and an FDD are taken as examples in the following description of a preferred embodiment of the present invention. It is, however, noted that the present invention is equally applicable to other data storage devices.

Figure 1:
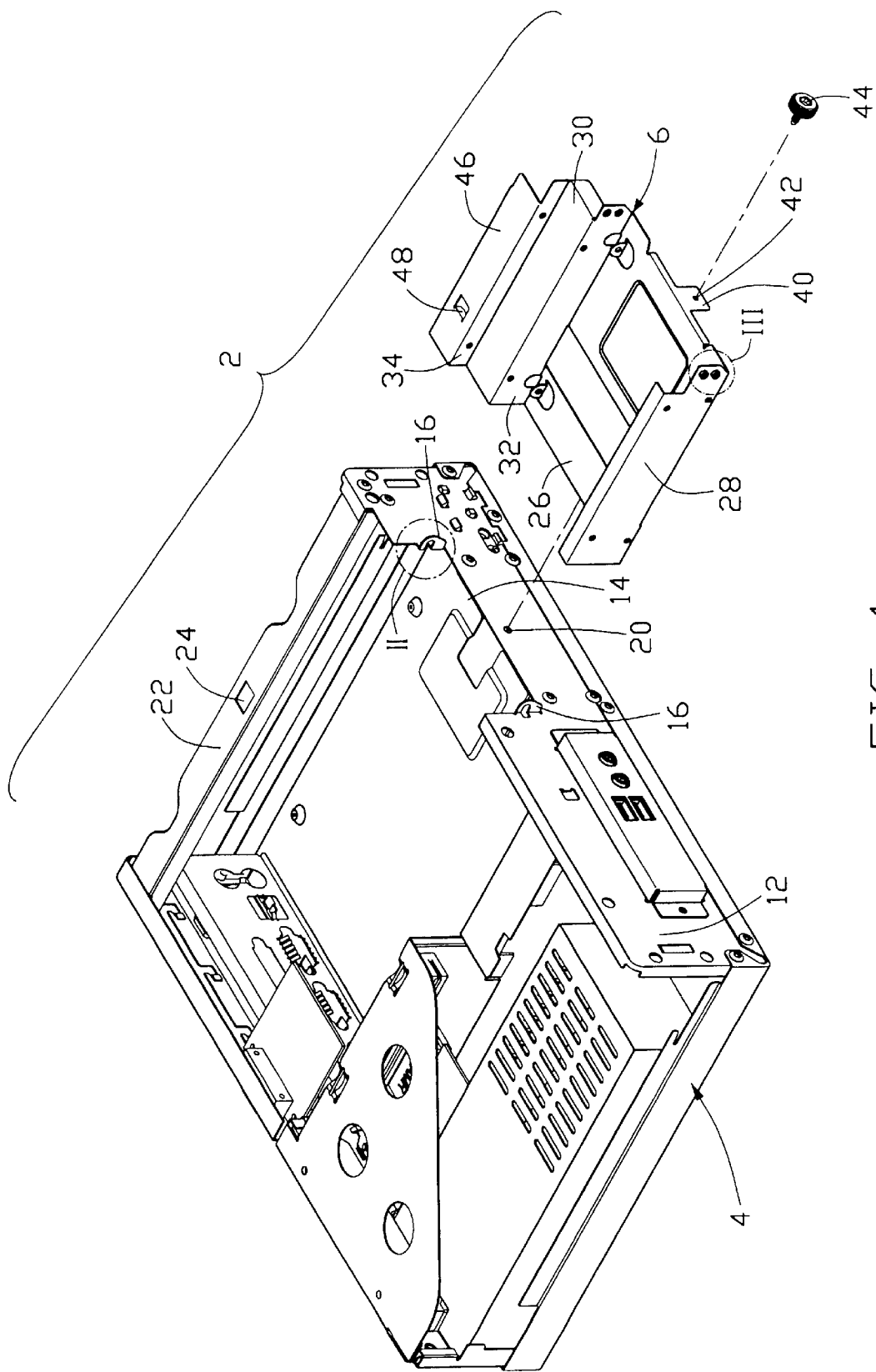
FIG. 1 is a perspective view of a computer enclosure embodying the concepts of the present invention with a drive bracket detached from a cage of the enclosure.
Figure 2:
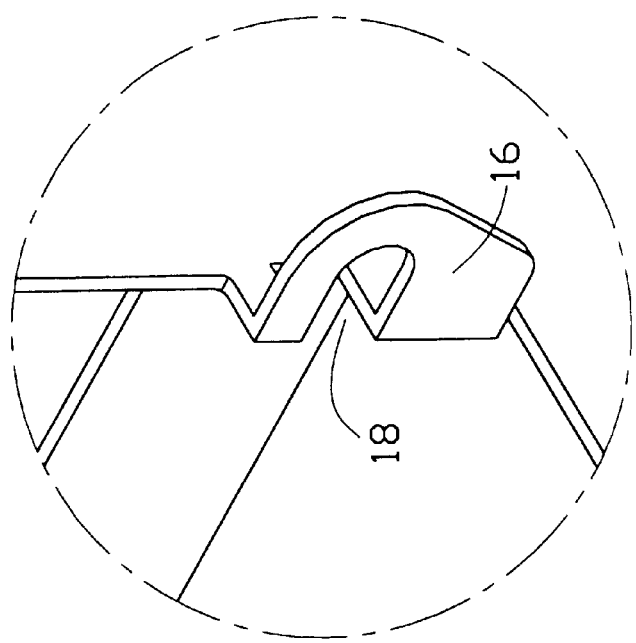
FIG. 2 is an enlarged view of circled portion II of FIG. 1.

Referring to FIG. 1, a computer enclosure 2 of the present invention includes a cage 4 and a drive bracket 6 movably attached to the cage 4 for retaining a CD-ROM drive 8 and an FDD 10 (see FIG. 4) in the enclosure 2. The cage 4 includes a front panel 12 defining an opening 14 for providing access to the CD-ROM drive 8 and the FDD 10 retained therein. A pair of bent tabs 16 outwardly extends from opposite edges of the opening 14 and each defines a cutout 18 (see FIG. 2). An aperture 20 is defined in the front panel 12 between the bent tabs 16. A beam 22 transversely extends from the front panel 12 and defines a notch 24 therein.

Figure 3:
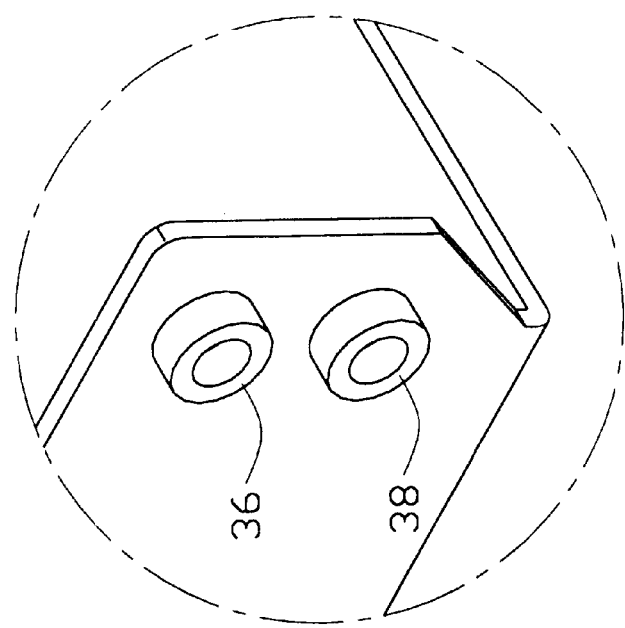
FIG. 3 is an enlarged view of circled portion III of FIG. 1
Figure 4:
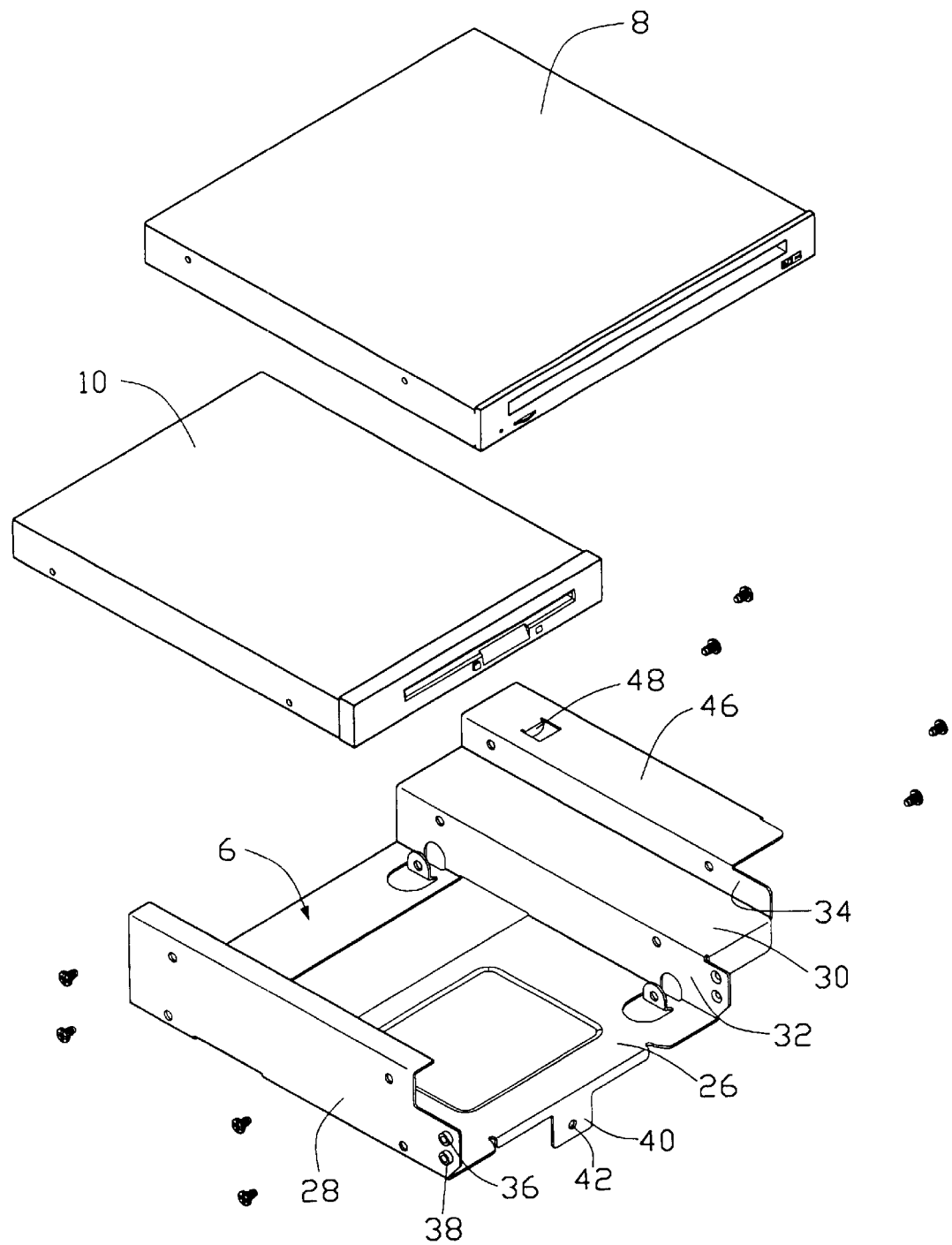
FIG. 4 is a perspective view of the drive bracket of FIG. 1, a floppy disk drive and a CD-ROM drive to be attached to the drive bracket.

Also referring to FIG. 4, the drive bracket 6 includes a base 26, a side wall 28 vertically extending from the base 26 and a stepped wall 30 extending from the base 26 opposite the side wall 28. A first carrier space 32 for receiving the FDD 10, and a second carrier space 34 for receiving the CD-ROM drive 8 are formed between the side wall 28 and the stepped wall 30. A pair of first protrusions 38 and a pair of second protrusions 36 (See FIG. 3) are formed on the side wall 28 and the stepped wall 30 proximate front ends thereof and at opposite sides of the first carrier space 32 and the second carrier space 34. The second protrusions 36 are designed to guide along edges of the bent tabs 16 and the first protrusions 38 are for being received in the cutouts 18 of the bent tabs 16 (see FIG. 2) for serving as pivots supporting rotation of the drive bracket 6 with respect to the cage 4. A fixing plate 40 perpendicularly extends from the base 26 and defines a screw hole 42 therein substantially aligning with the aperture 20 of the cage 4 for receiving a bolt 44 to secure the drive bracket 6 to the cage 4. A flange 46 extends from an upper edge of the stepped wall 30 for being slidably supported on the beam 22 of the cage 4. A projection 48 is formed on the flange 46 for engaging with the notch 24 of the cage 4.

Referring to FIGS. 1 and 5–8, in assembly, the drive bracket 6 is received in the cage 4 with the flange 46 supported on the beam 22 (FIG. 5). At this moment, the first protrusions 38 are not moved into the cutouts 18 of the bent tabs 16 (FIG. 6). Thereafter, the drive bracket 6 is moved with respect to the cage 4 thereby moving the first protrusions 38 into the cutouts 18 with the second protrusions 36 of the drive bracket 6 being guided along the edges of the bent tabs 16 of the cage 4 (FIGS. 7 and 8). The flange 46 of the drive bracket 6 slides on the beam 22 of the cage 4 with the projection 48 engaging with the notch 24 of the beam 22. The bolt 44 extends through the aperture 20 of the cage 4 and threadedly engages with the screw hole 42 of the drive bracket 6 thereby fixing the drive bracket 6 to the cage 4 at a fixed position.

Figure 9:
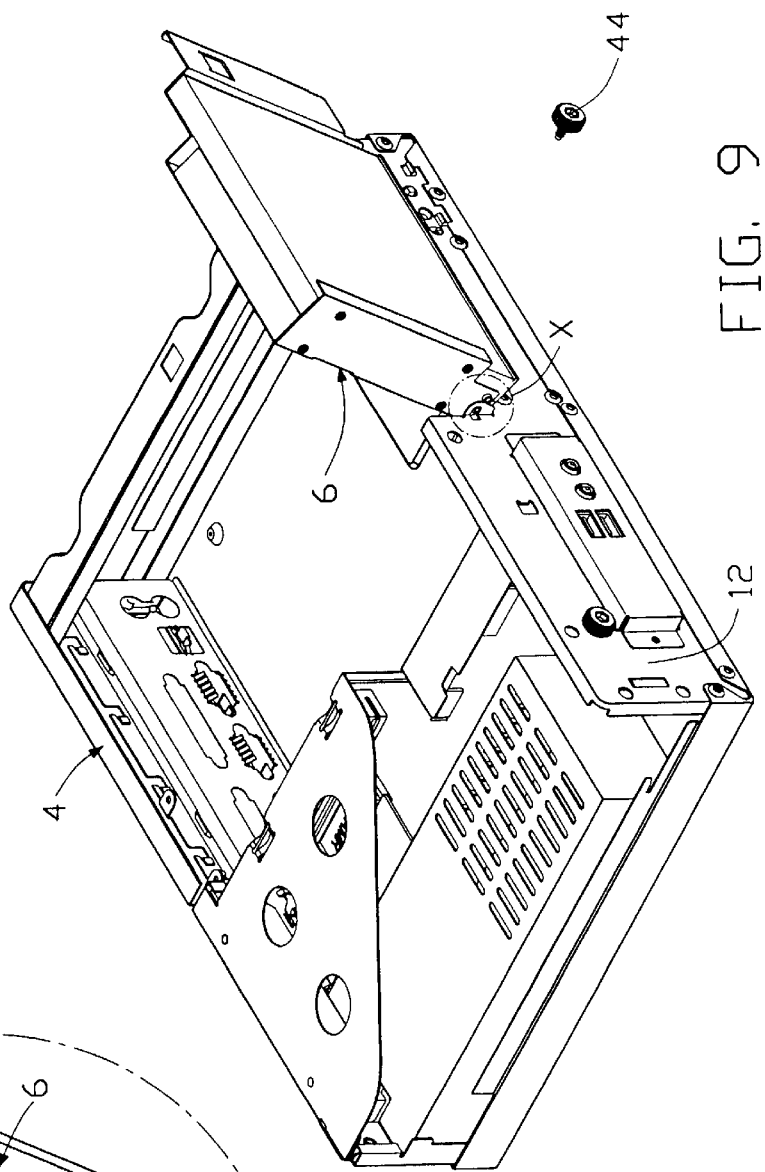
FIG. 9 is similar to FIG. 7 but showing the drive bracket being rotated with respect to the computer enclosure.
Figure 10:
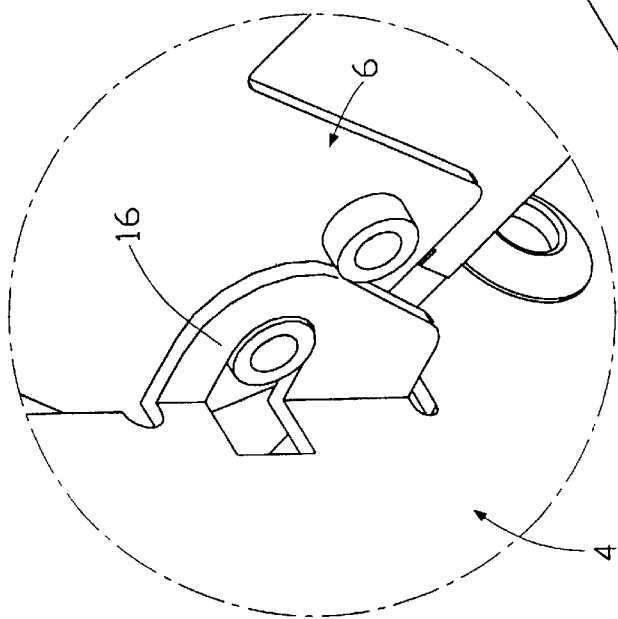
FIG. 10 is an enlarged view of circled portion X of FIG. 9.

Referring to FIGS. 9 and 10, when other components are required to be mounted to or under the drive bracket 6, the bolt 44 is first removed. The drive bracket 6 is rotated about the first protrusions 38 from the fixed position to an assembling position to expose the interior space of the cage 4 thereby facilitating mounting components thereto or thereunder.

The above description of an embodiment is to illustrate the present invention, but not to limit the scope of the present invention. Any changes or modifications that do not depart from the spirit of the present invention should be covered in the scope of the present invention as defined in the appended claims.

We claim:

1. A computer enclosure comprising:
   a cage having a pair of tabs each defining a cutout therein, an aperture being defined between the tabs; and
   a drive bracket attached to the cage, the drive bracket having a pair of first protrusions pivotably received in the cutouts of the tabs for allowing the drive bracket to rotate with respect to the cage and a fixing plate defining a screw hole substantially aligning with the aperture of the cage for receiving a bolt to secure the drive bracket to the cage.

2. The computer enclosure as described in claim 1, wherein the drive bracket forms a pair of second protrusions for being guided along edges of the tabs of the cage when the drive bracket is rotated.

3. The computer enclosure as described in claim 1, wherein the cage has a front panel and a beam transversely extending from the front panel, and wherein the pair of tabs extends from the front panel.

4. The computer enclosure as described in claim 3, wherein the drive bracket has a flange for being slidably supported on the beam of the cage.

5. The computer enclosure as described in claim 4, wherein the flange of the drive bracket forms a projection engageable with a notch defined in the beam for retaining the drive bracket in position.

6. A computer enclosure comprising:
   a cage comprising a front panel and a beam transversely extending from the front panel, the front panel forming a pair of bent tabs; and
   a drive bracket attached to the cage and pivotable about the cage about a fixed position and an assembling position, the drive bracket comprising a side wall and a stepped wall cooperatively forming a first carrier space and a second carrier space therebetween, a pair of first protrusions formed on the drive bracket for being rotatably mounted to the bent tabs of the cage and a flange extending from an upper edge of the stepped wall for being supported on the beam of the cage.

7. The computer enclosure as described in claim 6, wherein the front panel of the cage defines an opening, and wherein the pair of bent tabs extends from opposite edges of the opening.

8. The computer enclosure as described in claim 6, wherein each bent tab defines a cutout for receiving the first protrusion of the drive bracket.

9. The computer enclosure as described in claim 6, wherein the drive bracket forms a pair of second protrusions for being guided along edges of the bent tabs of the cage.

10. The computer enclosure as described in claim 6, wherein the flange of the drive bracket forms a projection engageable with a notch defined in the beam for retaining the drive bracket in position.

11. A method of assembling a storage device in a cage of a computer and exposing electronic components under the storage device, comprising the steps of:
    providing a drive bracket on which the storage device is securely seated;
    forming a pair of tabs on one of said cage and said bracket with cutouts therein;
    forming a pair of protrusions on the other of said cage and said bracket; assembling the bracket with the associated storage device to the cage with the protrusions respectively moving along the corresponding cutouts in a linear direction until said protrusions reach final positions;
    latchably fixing the bracket to the cage; wherein
       when the electronic components in the cage under the storage device are required to be replaced or added, the bracket is first unlatched from the bracket, and successively rotated about the final positions of said protrusions to expose said components.

12. The method as claimed in claim 11, wherein during assembling the bracket and the associated storage device to the cage, said bracket and the associated storage device are first downwardly installed into a space in the cage from a top portion of the cage, and successively moved with regard to the cage in said linear direction.

13. The method as claimed in claim 11, wherein during rotation the bracket and the associated storage device are tilted outwardly until fully outside a front panel of the cage.

14. The method as claimed in claim 11, wherein the step of latchably fixing the bracket to the cage comprises extending a bolt through the drive bracket to engage with the cage.

* * * * *